Patented Feb. 3, 1931

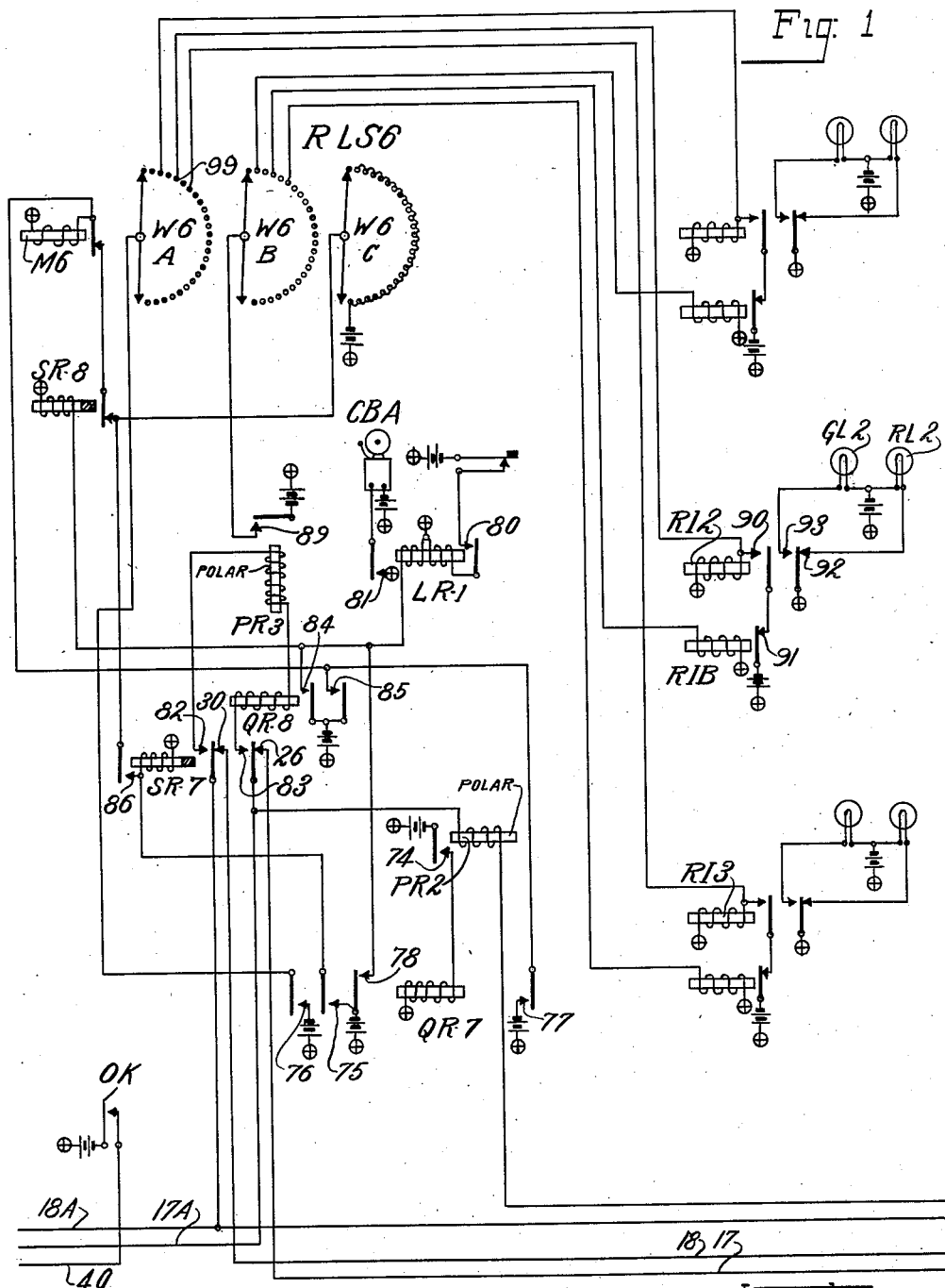

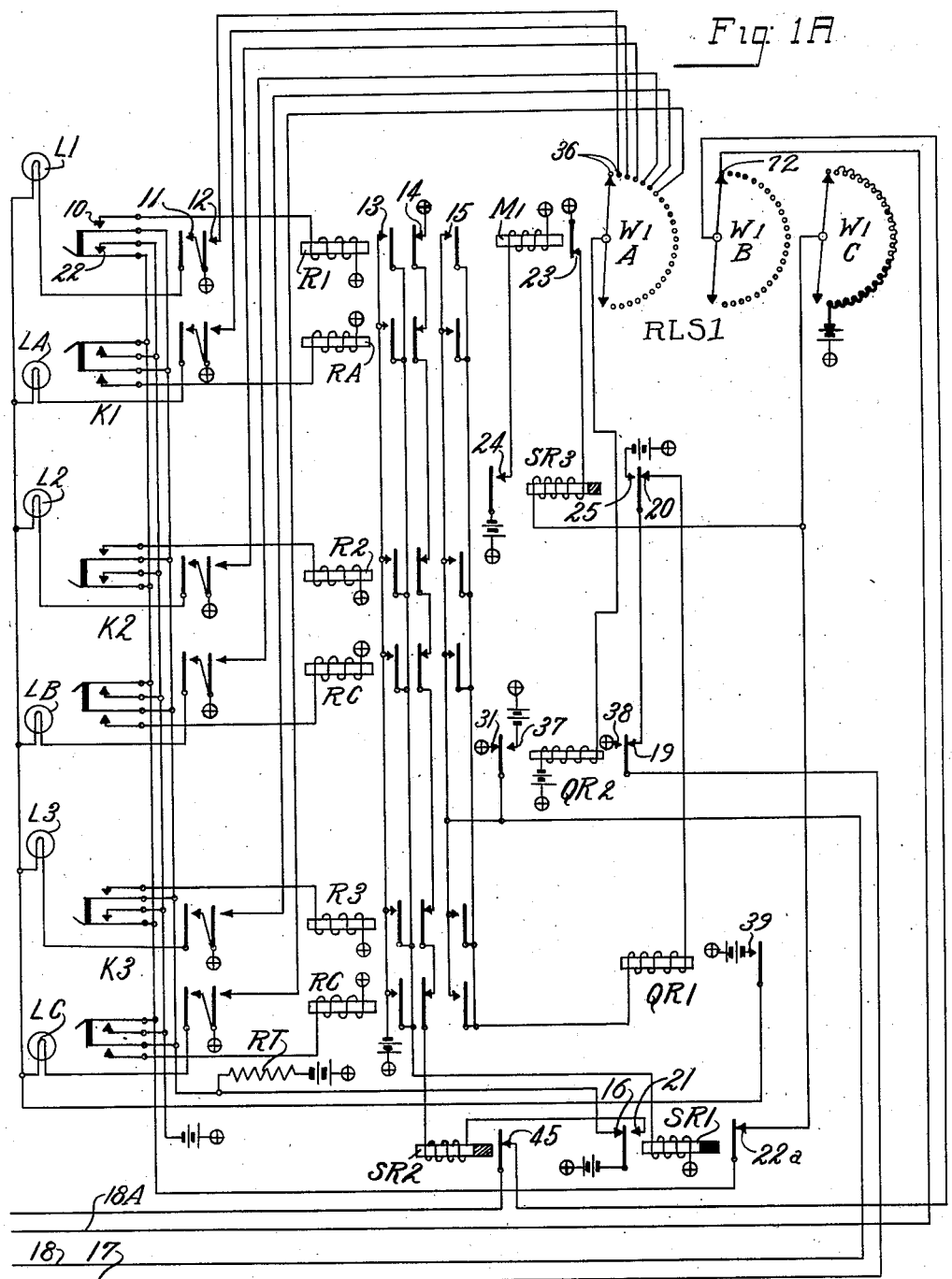

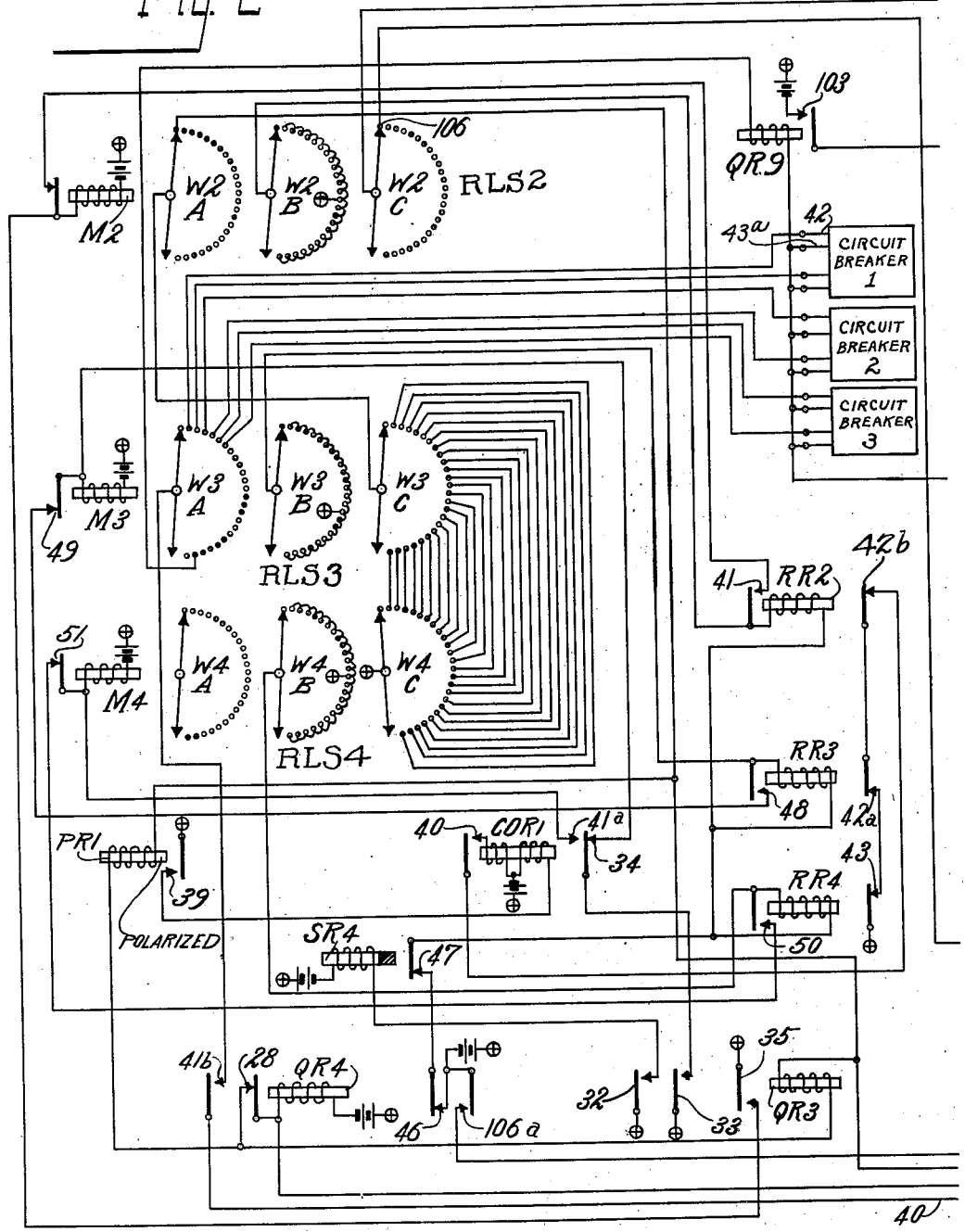

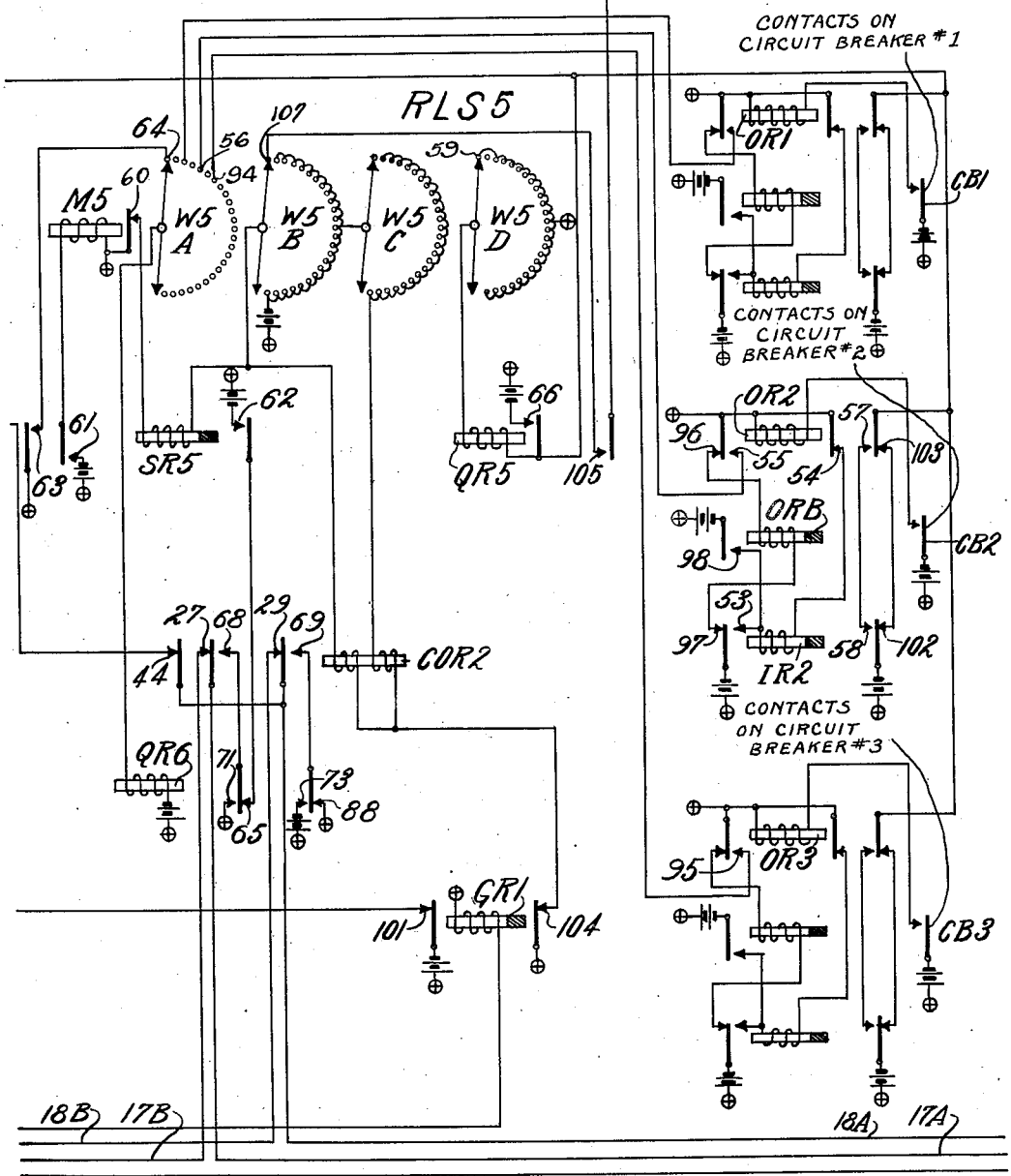

1,790,866

UNITED STATES PATENT OFFICE

ALFRED ERNEST HUDD, OF LIVERPOOL, ENGLAND, ASSIGNOR, BY MESNE ASSIGNMENTS, TO AUTOMATIC ELECTRIC INC., OF CHICAGO, ILLINOIS, A CORPORATION OF DELAWARE

REMOTE CONTROL SYSTEM

Application filed February 6, 1926, Serial No. 86,417, and in Great Britain February 13, 1925.

The present invention relates in general to remote control systems, more particularly to improvements in such systems which permit the transmitting of selecting and checking signals over a single line.

The principal object of the invention lies in an improved method of impulsing. A fixed number of impulses are transmitted from the central station to the substation whenever a signal is to be transmitted. A particular impulse in this series, however, is modified for instance by altering its direction from a positive to a negative impulse, the position of the altered impulse corresponding to the signal being transmitted. The checking signal is transmitted as soon as the fixed number of impulses have been transmitted if the devices at both stations have operated correctly. This checking signal will not be given unless all involved apparatus has been correctly operated.

The drawings comprising Figs. 1, 1A, 2, and 2A when arranged with Fig. 1A to the right of Fig. 1, with Fig. 2A to the left of Fig. 1 and Fig. 2 to the left of Fig. 2A, with the corresponding lines in alignment, show one adaptation of the invention. While I have chosen to shown my invention illustrated with a particular arrangement of equipment, I have done so merely by way of example, and do not wish to be limited thereby, as there are many modifications which may be made by one skilled in the art without departing from the scope of my invention.

Figures 1 and 1A represent the apparatus at the central station, the apparatus in Fig. 1 being responsive to signals received from the substation while the apparatus in Fig. 1A is that used for controlling the apparatus at the substation, for instance putting in or pulling out circuit breakers, or for preparing circuits to enable meter readings to be taken or for other similar and other allied purposes.

Figures 2 and 2A illustrate the apparatus at the substation, the apparatus shown in Fig. 2 illustrates the apparatus which responds to the selective action at the central station and serves to select the circuit breaker to be connected up or the allied circuit connection to be established as desired by the attendant at the control station. The apparatus in Fig. 2A is that which responds to the coming out of the circuit breaker to give a signal to the control station and to indicate the position of the various circuit breakers.

A description will first be given of the operation by which according to the invention a circuit breaker is put in at a substation under the control of the attendant at the control station. The apparatus shown is conveniently mounted on a panel on which will be visible keys K1, K2, K3 and associated therewith lamps L1, LA, L2, LB, L3, LC. The number of keys will correspond with the number of circuit breakers with an additional number according to the other operations it is desired to effect, such as the reading of a meter. The keys, it will be noted, can be moved either upwards or downwards so as to close the upper contacts or the lower contacts. Each of these movements corresponds to a different operation it is desired to effect, and the upward movement corresponds with putting a circuit breaker in, while the downward movement corresponds to pulling a circuit breaker out. For this reason the reference L followed by a numeral corresponds to the putting "in" of a circuit breaker, while L followed by a letter corresponds to the pulling of a circuit breaker "out." Associated with each key are a pair of relays which are given the references R1 and RA and so on in a similar manner to L1, LA, so that the relays may be identified with the lamps with which they are associated. Assuming that it is desired to put circuit breaker No. 1 in, the key K1 is moved upwards, a circuit being completed for relay R1 as follows: positive pole of battery, (represented by a plus sign within a circle throughout the drawings), relay R1, contact 10 of key K1, contact 16 of slow to release relay SR1 to the negative pole of battery. At contact 22 key K1 closes a circuit as follows: negative pole of battery, contact 22, contact 22a, relay SR3, interrupter springs 23 of magnet M1 to positive pole of battery. Relay R1 energizes and effects the following circuit changes: At contact 11 it prepares a circuit for lamp L1, at contact 12 it connects positive pole of battery to the first contact 36 of rotary line switch RLS1, at contact 13 it completes a circuit for relay SR1 from positive pole of battery, relay SR1, contact 13 to negative pole of battery; at contact 14 it opens a point in the circuit of slow relay SR2, while at contact 15 it connects quick relay QR1 across the conductors 17 and 18 as follows: conductor 17, contact 19, of quick relay QR2, contact 20 of slow relay SR3, relay QR1, contact 15 of relay R1 to conductor 18. Relay SR1 at contact 16 removes the short circuit about resistance RT, which, however, is of such a value that relay R1 receives enough current through this resistance to be maintained energized although it cannot be energized initially in this circuit; closes a point 21 in the circuit of relay SR2 and at contact 22a opens the circuit of relay SR3. Relay SR1 is made sufficiently slow to pull up, however, to ensure that this circuit is not opened prior to the energization of relay SR3 in the circuit including contact 22 of key K1. Relay SR3 in energizing closes a circuit for the rotary magnet M1 of rotary line switch RLS1, at contact 24, while at contact 25 it connects negative pole of battery through contact 25, contact 19 conductor 17, contact 26, conductor 17A (leading to substation), contact 27, conductor 17B, contact 28, relays PR1 and QR3 in parallel, conductor 18B, contact 29, conductor 18A (leading back to control station), contact 30, conductor 18, contact 31 of relay QR2 to positive pole of battery. In this circuit relay QR3 energizes; with the current flowing in the direction described relay PR1 does not energize. QR3 brings about the following circuit changes: At contact 32 a circuit is completed from positive pole of battery, slow to release relay SR4 to negative pole of battery, at contact 33 a circuit is completed from positive pole of battery, contact 33, contact 34, magnet M3 of rotary line switch RLS3, negative pole of battery, while at contact 35 a circuit is completed from positive pole of battery, contact 35, magnet M2 of rotary line switch RLS2 to positive pole of battery. The rotary line switches RLS1, RLS2, RLS3, RLS4 are switches of the step by step type similar to those used in automatic telephone systems, having a plurality of wipers adapted to be moved round in a continuously forward direction step by step over a bank of contacts by means of a ratchet mechanism. The wipers move in a single plane and advance on the deenergization of the motor magnets. A switch of this type is shown in Fig. 48, on page 51 of the second edition of the book, "Automatic Telephony" by Smith and Campbell. It will thus be appreciated that the initial effect brought about by pressing the key K1 in an upward direction at the control station is to bring about the energization of relay SR4 and the magnets M2 and M3 at the substation. At the control station the slow acting relay SR3 is only slightly sluggish so as to ensure that it will not deenergize due to the opening of the interrupter contacts 23 by the magnet M1 before the magnets M2 and M3 at the substation have been properly energized. In other words SR3 is just rendered sufficiently sluggish to ensure that the impulse transmitted under the control of the automatic operation of the rotary line switch RLS1 will not be too fast to properly and accurately control the operation of the rotary line switches RLS2, RLS3, RLS4 at the substation. When relay SR3 falls back a short time after the energization of magnet M1 it opens the circuit of M1 which thereupon releases. At the same time it opens at contact 25 a circuit of relay QR3 which in turn opens the circuit of magnets M2 and M3. As a result the wipers of the switches RLS1, RLS3, RLS4 all advance one step with the result that the wiper W1A advances to the first contact and thereupon a circuit is completed as follows: positive pole of battery, contact 12 of relay R1, second contact 36 in the bank of wiper W1A, that wiper, quick relay QR2 to negative pole of battery. QR2 energizes and opens contacts 19 and 31 and closes contacts 37 and 38, whereby the current over the conductors 17 and 18 is sent in the reverse direction. At the same time the wiper W1C advances on to the first bank contact which is multipled to all the other bank contacts and connected to the negative pole of battery, so that a circuit is completed for SR3 as follows: negative pole of battery, contact bank and wiper W1C, relay SR3, interrupter springs 23 which close when the magnet M1 deenergizes, to positive pole of battery. The reversal of battery over the leads 17 and 18 causes the relay QR3 to energize and this time also the relay PR1. The relay PR1 completes a circuit for the cutoff relay COR1 as follows: positive pole of battery, contact 39, right-hand winding of relay COR1 to battery. Relay COR1 energizes and at contact 40 completes a locking circuit for itself as follows: negative pole of battery, left-hand winding of relay COR1, contact 40, contact 42b, contact 42a, contact 43, to positive pole of battery, while it opens contacts 34 and at contact 41a connects up the magnet M4 in place of the magnet M3 whose circuit was opened at 34. Consequently the relay QR3 in energizing this time completes a circuit for magnet M4, instead of magnet M3, the other operations are the same, the relay SR4 is arranged to be sufficiently slow that it will not release in between successive operations of relay QR3 during the series of impulses. The rotary line switch RLS3 therefore rests with its wipers on the first contact thereby giving an indication of the contact marked on the rotary line switch RLS1. As described the energization of relay SR3 closes at contact 24 the circuit for magnet M1 which again energizes and opens contact 23, whereupon the circuit of relay SR3 is opened and this relay deenergizes so permitting the magnet M1 to deenergize and the wipers W1A, W1B, W1C to pass to the second position. When this occurs the circuit of relay QR2 is opened at contact 36 and this relay deenergizes so that on the next impulse the direction of current flowing over the conductors 17 and 18 will be in the same direction as that first described. Relay SR3 energizes again as soon as contact 23 closes in the circuit including wiper W1C and the pulse thus sent over the conductors 17 and 18 causes the relay QR3 to pulse the magnet M2 and magnet M4. The transmission of impulses then occurs automatically in the manner just described until the wiper W1C reaches the normal position when no further circuit can be completed for the relay SR3. By this time assuming a bank of 25 contacts, 25 impulses will have been sent over the conductors 17 and 18. These 25 impulses will have operated the magnet M2 25 times so that the rotary switch RLS2 will be, or should be in its normal position. The rotary line switch RLS3 owing to the magnet M3 only having received one impulse will have its wiper resting on the first contact, while the rotary line switch RLS4 having received the remaining 24 impulses will have its wipers resting on the 24th contact. Provided that all these switches have taken up the position mentioned which will have occurred if the impulses have been transmitted correctly and no false impulse has been received at any time during the transmission due to stray currents on the line, the following circuit will have been completed:—positive pole of battery, wiper W4C on the 24th contact, wiper W3C on the 1st contact, wiper W2A in normal position, conductor 18B, contact 29, conductor 18A, contact 30, conductor 18, contact 15, relay QR1, contact 20, contact 19, conductor 17, contact 26, conductor 17A, contact 27, conductor 17B, relay QR4 to negative pole of battery. In this circuit relays QR1 and QR4 energize in series. Relay QR4 opens contact 28 and contact 46, closing contacts 41b and 106a. At contact 106a a circuit is completed for guard relay GR1 which energizes so long as QR4 is energized, and by opening contacts 101, 104, prevents signals being transmitted in the opposite direction until the completion of the operation at the control station. Relay QR1 completes the following circuit: negative pole of battery, contact 39 of relay QR1, lamp L1, contact 11 to positive pole of battery. Lamp L1 thereupon lights thus signifying to the attendant at the control station that the three swiches RLS2, RLS3 and RLS4 have operated correctly, i. e. RLS2 to make a complete revolution and RLS3 and RLS4 to set their wipers on contacts which are complementary to one another. This having been effected the attendant at the control station can now effect the putting in of the circuit breaker. To do this he presses the operating key OK which completes a circuit as follows: negative pole of battery, contacts of key OK, conductor 40, contact 41b of relay QR4, wiper W3A and the 1st contact engaged thereby to the conductor 42 of a pair of conductors C1, which lead to an operating magnet by which the circuit breaker is put in. The other conductor 43a is connected over contact 44 to lead 18A and thence over contact 30, lead 18, contact 31 to positive pole of battery. A circuit breaker of this type is shown in the copending application of Nelson, Serial No. 515,664, filed Nov. 16, 1921, for example circuit breaker CB4 of Fig. 5. In applying this circuit breaker to the system of my invention, lead 42 would be connected to lead 117 of Nelson, and the battery connected to the magnet 341 of Nelson would be replaced by my lead 43. Consequently the operating magnet 341 of Nelson would be energized by the battery at the control station. It may be that the controller presses the wrong key K1, K2, K3, or operates the key in the wrong direction initially, if he does this it is checked at once by the lamp lighted, and he will therefore not operate the key OK, but restore the operated key, thereby releasing the relay R1 and opening the circuit of QR1 and QR4 at contact 15. These relays both deenergize as also a short time after does the relay SR1 whose circuit is opened at contact 13. Relay SR2 is momentarily operated through back contact 14 of relay R1, back contacts of all the other relays RA, R2, R3, RC, winding of relay SR2, contact 21 of relay SR1 to negative pole of battery. Relay SR2 momentarily opens contact 45 to open the circuit of the polarized relay PR2, the purpose of which is to keep open the circuit of this relay for a sufficient time to ensure that the apparatus has returned to normal. The deenergization of relay QR4 in conjunction with the deenergization of relay SR4 which has followed shortly after the relay QR3 stopped receiving impulses from the central station, causes a circuit to be completed as follows: negative pole of battery, contact 46, of relay QR4, contact 47 of relay SR4 and the following circuits in parallel: release relay RR4, wiper W4B, 24th contact of the multipled bank engaged by this wiper to positive pole of battery; also release relay RR3, wiper W3B first contact of the multipled contacts engaged by this wiper to positive pole of battery. Relays RR3 and RR4 both energize in this circuit, and complete the following circuits: RR3 at contact 48, completes a circuit as follows: positive pole of battery, wiper W3B, contact 48, interrupter springs 49, magnet M3 to negative pole of battery. Magnet M3 is thereby energized and as it interrupts its own circuit and in view of the fact that the contacts engaged by W3B are all multipled together except in a normal position, wipers W3A, W3B, W3C are all automatically stepped to normal position. When this occurs the energizing circuit for relay RR3 is broken at wiper W3B and releases. A similar result is brought about by relay RR4 which at contact 50 completes a circuit through the positive pole of battery, 24th multipled contact, wiper W4B, contact 50, interrupter springs 51, magnet M4, to negative pole of battery. Magnet M4 thereupon operates to bring the wipers W4A, W4B, W4C to a normal position, whereupon relay RR4 deenergizes. The energization of relays RR3 and RR4 at contacts 42 and 43, opens the locking circuit for relay COR1, which accordingly deenergizes and hence everything at the control station has been restored to normal in readiness for the transmission of a fresh signal. It will be clear that the restoration of the keys depressed to normal either before or after an operation has taken place causes the switches to restore to normal in the same way as in the circuit described as this circuit is not dependent upon the circuit completed by the key OK, relay QR4 which determines whether the operation is to be effected or not being held up entirely under the control of the operating keys K1, K2, K3 at the control station.

It should be noted that a direct circuit extends from lead 40 and lead 18 to any of the pairs of conductors C1, C2, C3. Consequently if it should be desired to take a meter reading or to take any other observation or perform any other operation which could be effected over two conductors from a distance in view of this circuit being a clean circuit this could be done by simply connecting a pair of leads similar to C1 to the apparatus which requires to be operated or observed. If for example it was desired to ascertain the load upon the conductors 1 and 2 of Fig. 1, of the Patent 742,681, issued to Laird, October 27, 1903, the apparatus in the dotted square to the left of Fig. 1 of this patent would be connected across a pair of conductors such as a 42 and 43a, while at the dispatcher's office the telephone D would be connected across the conductors 40 and 18. In other words, conductors 40 and 18 would replace conductors 3 and 4 of the Laird patent. When it was desired to ascertain the load upon the power leads 1 and 2, the equipment would be stepped around so that wiper W3A of the switch RLS3 encounters the contact to which conductor 42 is connected, the operating key OK would be momentarily depressed to start the mechanism in the dotted square A1 of Laird and the impulses delivered by that mechanism would be audible in the receiver of the telephone. The operation of the key OK would correspond to the momentary closure of the switch E to connect the battery C across the lead 3—4 of Laird. Thus by way of example it will be seen how telemetering can be applied to the system of my invention.

A description will now be given of the manner in which the attendant at the control station is notified of the coming out of a circuit breaker. Associated with each circuit breaker is a pair of contacts represented by CB1, CB2, CB3. If the circuit breaker CB1 corresponds to the breaker CB4 of Nelson as mentioned hereinbefore, spring set CB1, is the set controlled by armature 343, that is armature CB1 is 343. When the circuit breaker falls out the contact is closed and hence a circuit is completed: assuming that circuit breaker No. 2 falls out, a circuit is then completed as follows: negative pole of battery, contact CB2, relay OR2 to positive pole of battery. It should be mentioned that normally while the circuit breaker is in, relay IR2 is energized and locked energized in the following circuit: negative pole of battery, contact 53, winding of relay IR2, contact 54, positive pole of battery. Consequently when relay OR2 energizes on the circuit breaker coming out, contact 54 is opened and the locking circuit for relay IR2 opened, so that this relay will fall back shortly afterwards. At contact 55 relay OR2 connects the positive pole of battery over contact 55 to the fifth contact 56 of the bank wiped over by wiper W5A of the rotary line switch RLS5, at contact 57 a circuit is momentarily closed as follows until the relay IR2, falls back: negative pole of battery, contact 58, contact 57, relay QR5, normal contact 59 of the bank contacts wiped over by wiper W5D of the rotary line switch RLS5, wiper W5D to positive pole of battery. Relay QR5 thereupon energizes and is locked energized over contact 66, while at contact 105 it completes a circuit for relay SR5 as follows: negative pole of battery, contact 101, wiper W2C of rotary line switch RLS2, normal contact 106, contact 105, normal contact 107, wiper W5B of rotary line switch RLS5, relay SR5, interrupter contact 60 to positive pole of battery. A branch of this circuit extends over the left-hand winding of cut-off relay COR2 to positive pole of battery. It will be appreciated that these circuits can only be completed when the rotary line switch RLS2 is at normal and relay GR1 deenergized. Relay COR2 energizes and at contacts 27, 29 and 44 disconnects the leads 18A, 17A, respectively from the conductors 18B, 17B, and the multipled lead connected to conductor 43, and connects leads 17A and 18A at contacts 68 and 69 to contacts controlled by relay QR6.

Relay SR5 on energizing brings about the following circuit changes: at contact 61 completes a circuit from negative pole of battery, magnet M5 to positive pole of battery, thereby energizing magnet M5. At contact 62 it prepares a point in a circuit which, however, is of no effect at this time, and at contact 63 it connects positive pole of battery through the normal contact 64 and wiper W5A, relay QR6 to negative pole of battery. Relay QR6 on energizing completes a circuit as follows: positive pole of battery, contact 71, contact 68, lead 17A, polarized relay PR2, contact 45, wiper W1B, normal contact 72 of rotary line switch RLS1, conductor 18A, contact 69, contact 73 to negative pole of battery. Relay PR2 energizes and closes the following circuit: negative pole of battery, contact 74, relay QR7 to positive pole of battery, relay QR7 energizes and brings about the following circuit changes: At contact 75 it completes a circuit for slow release relay SR7 as follows: negative pole of battery, contact 75, winding of relay SR7 to positive pole of battery; at contact 76 negative pole of battery is connected to wiper W6B of the rotary line switch RLS6, at contact 77 negative pole of battery is connected to magnet M6, and thence to positive pole of battery: at contact 78 a circuit is completed from negative pole of battery, contact 78, left-hand winding of relay LR1 to positive pole of battery, while a branch of the circuit extends through slow release relay SR8, to positive pole of battery. Relay SR8 thereupon energizes; relay LR1 locks itself energized in the following circuit: negative pole of battery, contacts 79 of alarm bell key, contact 80 right-hand winding of relay LR1 to positive pole of battery, while at contact 81 relay LR1 completes a circuit from negative pole of battery through circuit breaker alarm CBA through contact 81 to positive pole of battery, thereby sounding an alarm and calling the attention of the attendant at the main station that a circuit breaker has come out. Relay SR7 on energizing opens contacts 26 and 30 thereby breaking connection between conductors 17 and 18 and 17A and 18A, and connects conductors 18A and 17A at contacts 82 and 83 together by a circuit including the polarized relay PR3, and relay QR8. Relay PR3, however, does not energize at this time as it responds to current flowing in the opposite direction to that to which relay PR2 responds. Relay PR2, however, remains connected up in parallel to the series circuit including relays QR8 and PR3. Relay QR8 energizes and completes a circuit for SR8 at contact 84 in parallel to that previously described over contact 78, while at contact 85 it completes a circuit for magnet M6 in parallel to that over contact 77.

Returning to the operation at the substation it will be remembered that magnet M5 had energized, the effect of this energization is to open the interrupter contacts 60, whereupon the relay SR5 deenergizes shortly after, which opens the circuit of magnet M5, thus permitting the wipers W5A, W5B, W5C, W5D to advance one step. At the same time the circuit through QR6 is opened at contact 64 and the circuit extending over the conductors 17A and 18A is opened at contact 71, and at contact 73, thereby allowing relays PR2 and QR8 to deenergize, whereupon the circuit for magnet M6 is opened and the wipers of the rotary line switch RLS6 advance one step, thereby completing a locking circuit for relay SR7 as follows: positive pole of battery, winding of relay SR7, contact 86, wiper W6C, multipled contacts 87 to negative pole of battery, so that this relay is maintained energized as long as the wipers W6A, W6B, W6C are in an off normal position. Relay SR8 being slow to release, remains energized as long as impulses are being transmitted. The closing of contact 60 when magnet M5 deenergizes at the substation causes the relay SR5 to again energize whereupon the current impulse in the opposite direction to that previously described is transmitted over the conductors 18A and 17A. This circuit may be traced as follows: negative pole of battery, contact 62, contact 65, contact 68, conductor 17A, contact 83, relay QR8, relay PR3, contact 82, conductor 18A, contact 69, contact 88 to positive pole of battery. Relay PR2 is also excited by this current in the branch circuit previously traced, but only relay PR3 energizes with current in this direction. Relay QR8 also energizes and gives another pulse over contact 85 to magnet M6. Shortly after relay SR5 deenergizes allowing the magnet M5 to release also QR8 and PR3, consequently M6 releases and the wipers of the switches RLS5 and RLS6 advance a second step. If circuit breaker No. 1 was out at this instant, relay QR6 would energize over wiper W5A, third contact of bank contacts of relay OR1 to positive pole of battery, but in the present description it will be assumed that it was in. If it was out the same conditions would arise up to a certain point as occurs when circuit breaker No. 2 comes out. The difference occurs if circuit breaker No. 1 has come out and been recorded prior to circuit breaker No. 2 coming out, in which case No. 1 of itself would be unable to initiate the transmission of signals again. The two switches thus operate in unison until the 5th contact 56 is reached by wiper W5A. When this occurs a circuit is completed for relay QR6 as follows: positive pole of battery, contact 55, contact 56, wiper W5A, relay QR6 to negative pole of battery. Relay QR6 energizes and opens contacts 88 and 65 closing contacts 73 and 71, thereby reversing the direction of current flow over the leads 18A and 17A. This reversal of current, while still permitting the energization of QR8 and the consequent stepping of the wipers W6A, W6B, W6C also energizes relay PR2; the polarized relay PR2 energizes relay QR7 which in turn completes the following circuit: negative pole of battery, contact 76, wiper W6A in fifth position, relay RI2, to positive pole of battery. Relay RI2 energizes and at contact 90 locks energized in the following circuit: negative pole of battery, contact 91, contact 90, relay RI2 to positive pole of battery, while at contact 92 it opens the circuit of the red lamp RL2 which was lit indicating that the circuit breaker was in, thereby extinguishing it and lighting a green lamp GL2 over contact 93. The generation of impulses continues, but no more signals will be given unless other circuit breakers have come out. If other circuit breakers should have come out, for instance circuit breaker 3, then when wiper W5A reaches the seventh contact, a circuit will be completed for relay QR6, over seventh contact 94, contact 95 to positive pole of battery. Reversal of current over the line will again take place, relay PR2 will be again energized and relay R13 would pull up, and also show a green lamp. Relay QR5 would have its circuit opened at wiper W5D after the switch RLS5 had made its first step. This relay would therefore deenergize and would not energize again unless another circuit breaker fell out in the meanwhile. If another circuit breaker fell out in the meanwhile, that is while the rotary line switch RLS5 was rotating, relay QR5 would receive a momentary impulse as previously described from the relays associated with the circuit breaker which has come out, and would lock up at contact 66 and W5D until a second revolution had begun and wiper W5D stepped on to the second contact, and the effect of this relay locking up would be to ensure that the rotary line switch RLS5 would make a second revolution so as to repeat the signals just given, and ensure that a signal was given of the circuit breaker which has come out second, as it may be that when it came out the signaling position might have been passed. It should be mentioned that relays SR5 and COR2 after the first impulse were energized in a circuit over the multipled contacts wiped over by wiper W5B to negative pole of battery.

It will now be assumed that the circuit breaker CB2 is put in by the operator at the control station in the same manner as described in connection with the putting in of circuit breaker CB1. In this case, however, instead of operating K1 the key K2 would be moved in an upward direction. When the circuit breaker CB2 is inserted, contact CB2 opens and relay OR2 deenergizes, whereupon a circuit becomes momentarily completed as follows:—negative pole of battery, contact 102, contact 103, relay QR5, wiper W5D in normal position, contact 59, to positive pole battery, so that the initiation of the operation of the switches RLS5 and RLS6 is started as previously described: relay SR5, relay COR2 and relay QR6 being operated also. The relay OR2 upon deenergizing completes a circuit for relay ORB as follows: positive pole of battery, contact 96, relay ORB, contact 97 to negative pole of battery. Relay ORB energizes and completes a circuit for relay IR2 as follows: positive pole of battery, contact 54, relay IR2, contact 98, to negative pole of battery. IR2 energizes and locks energized over the following circuits: negative pole of battery, contact 53, relay IR2, contact 54, positive pole of battery, and at contact 102 opens the momentary circuit previously described for starting the switch RLS5. At this time, however, when the wiper W5A passes over the 5th contact, no circuit will be completed for the relay QR6. Consequently there will be no circuit for the relay RI2, but a circuit will be completed for the relay RIB as follows: negative pole of battery, contact 89 (relay PR3 being energized) wiper W6B, 4th contact 99, relay RIB to positive pole of battery. Relay RIB energizes, opens the locking circuit of relay RI2, thereby causing this relay to deenergize, which at contact 92 completes a circuit for the red lamp RL2, the circuit of the green lamp GL2 being opened at 93. This change from a green to a red lamp indicates to the attendant that the circuit breaker has been replaced. If the operator at the control station desires to have a check of the position of the circuit breakers he can do this by pressing a special key, not shown, so as to set the rotary line switch RLS3 on the 24th contact, whereupon a circuit is established from lead 40 over contact 41b (relay QR4 being energized) wiper W3A, left hand winding of relay QR9, contact 44 to lead 18A, so that by pressing the operating key relay QR9 is energized in a similar manner to that described in the operation of putting in a circuit breaker. Relay QR9 on energizing completes a circuit over contact 103, relay QR5 to the normal contact 59 of switch RLS5 so as to set the rotary line switches RLS5 and RLS6 in operation in the manner previously described. The full sequence of operation proceeds as previously described, and the position of all the circuit breakers will be checked and reset if necessary, so as to indicate the actual condition of the circuit breakers at the substation to the attendant at the control station. It will thus be appreciated that by means of the invention a very adequate check has been provided to ensure that only the correct operation is performed, the selecting operation being checked, and subsequently there being a check that the correct operation has actually taken place, while further, this can be checked under the control of the attendant at any time he desires and any circuit breaker coming out at the control station is immediately recorded at the main station and an alarm set in action which can only be restored to normal by operating the contact breaker alarm key 79 so as to release the relay LR1.

It will be noted that the invention as described ensures that when a selecting signal is being transmitted a circuit breaker coming out should only be able to take control of the line when the rotary line switches have returned to normal, as otherwise a false indication of the positions of the circuit breakers may be given. It is considered desirable to provide this safeguard although the operator can always check the indications by the arrangement shown.

The arrangement described possesses the advantage that the notification of a circuit breaker coming out always prevents the line being used for a selecting or operating signal and this is very important in practice.

Having thus described my invention, what I consider new and desire to have protected by Letters Patent is pointed out in the appended claims.

What is claimed is:

1. In a remote control system, a control station and a distant station, a trunk circuit between said stations, a plurality of devices at said distant station, a selecting circuit over which said devices are operated, a sender, means including said sender for sending a constant number of impulses over said trunk circuit, means for altering the character of any one of said impulses, the particular impulse being changed depending upon the particular device to be selected, a first mechanism, means for operating the first mechanism to set such mechanism in a selecting position responsive to the impulses transmitted before said altered impulse, a second mechanism, means for operating said second mechanism to set such mechanism in a complementary position responsive to the remaining transmitted impulses, and means operated only in case said mechanisms have been set in complementary positions in response to the said constant number of impulses for completing said selecting circuit for the selected device.

2. In a remote control system, a control station and a distant station, a trunk circuit between said stations, devices in the distant station and a pair of switches for selecting one of said devices, an operating circuit for operating said devices, a control circuit, a sender in the control station having means for transmitting a selecting signal over said trunk circuit to the switches including a constant number of impulses one of which is reversed, the particular impulse being reversed depending on the particular device to be selected, means in one of said switches operated responsive to each of the impulses transmitted prior to the reversed impulse for operating said switch to close a point in both said operating circuit and said control circuit, means in the other of said switches responsive to each of the remaining impulses transmitted for operating said other switch to complete said control circuit, and means included in said control circuit and operated thereover only in case said switches have been operated to totalize the said constant number of impulses for completing said operating circuit.

3. In a remote control system, a control station and a distant station, devices in the distant station, a circuit between said stations, a sender including means for transmitting a constant number of impulses over said circuit, a first and a second switch responsive to said impulses for selecting one of said devices, means for reversing the polarity of only one of said impulses, means responsive to the impulses transmitted before said reversal for operating said first switch to prepare the selection of a desired one of said devices, and means responsive to said reversal for stopping said first switch and for starting said second switch, means whereby the said second switch is operated responsive to the remaining impulses and means operated only in case said switches are operated to totalize the said constant number of impulses for completing the selection of said device.

4. In a remote control system, a control station and a distant station, step by step switches in said distant station, a sender switch in said control station, a circuit between said stations, means for operating said sender switch to transmit a signal comprising a continuous series of impulses over said circuit, means for operating the first of said distant station switches in unison with the sender in response to said impulses, means in the sender for altering a certain one of said impulses, means responsive to the altered one of said impulses for stopping said first switch and starting a second one of said distant station switches operating in unison with said sender, and means operated only in case said distant station switches have operated in exact unison with said sender switch for completing a selection in response to said signal.

5. In a remote control system, devices, an impulsing circuit, a sender switch including means to transmit impulses over said circuit, a pulsing relay and a polarized relay in said circuit, said polarized relay being unresponsive to the normal current flow in said circuit, a step by step switch controlled by the operation of said pulsing relay, means controlled by said sender switch for reversing the polarity of said circuit during a particular impulse to operate said polarized relay, a second step-by-step switch and means controlled by the operation of said polarized relay for diverting said first step by step switch from the control of said impulsing relay, and for bringing said second step-by-step switch under the control of said impulsing relay to operate said switch, and means operative only in case said switches are operated to totalize the number of impulses transmitted by said sender for selecting one of said devices for operation.

6. In a control system, two step-by-step switches, means for transmitting a fixed number of impulses, one of which is of opposite polarity to the rest, a selecting circuit, means responsive to said impulses for operating said switches to assume complementary positions, the first of said switches set in a position in accordance with the number of impulses transmitted before the reversed impulse and the second of said switches set in a position in accordance with the remaining transmitted impulses, and means operated only in case said switches have been operated to complementary positions responsive to said fixed number of impulses for completing said selecting circuit.

7. In a control system, two step-by-step switches, means for transmitting a fixed number of impulses, one of which is of opposite polarity to the rest, a selecting circuit, means responsive to said impulses for operating said switches to assume complementary positions, the first of said switches set in a position in accordance with the number of impulses transmitted before the reversed impulse and the second of said switches set in a position in accordance with the remaining transmitted impulses, means operated only in case said switches have been set in complementary positions in response to said fixed number of impulses for completing said selecting circuit, and manual controlled means for sending an operating impulse over said selecting circuit.

8. In a remote control system, a control station and a distant station, an impulsing circuit between said stations, two automatic switches in the distant station, a sender in the control station comprising a step-by-step switch, a motor magnet, an impulsing relay, and a reversing relay, means for initially energizing said impulsing relay to energize the sender motor magnet and to transmit an impulse over said circuit to operate one of said switches in the distant station, means controlled by the energization of said motor magnet for deenergizing said impulsing relay, the deenergization of said impulsing relay causing the termination of the impulse and the deenergization of the said motor magnet to move the switch in the control station one step, means for thereafter reenergizing said impulsing relay a predetermined number of times whereby the said motor magnet and impulsing relay interact in the manner set forth to step the switch in the control station and to transmit a predetermined number of impulses over said circuit, means controlled by the switch in the control station responsive to its reaching a certain position for operating said reversing relay, means controlled by said reversing relay for reversing the polarity of one of said transmitted impulses, means in the distant station responsive to said reversed impulse for stopping said first switch and for starting the second switch in the distant station, means for operating the said second switch responsive to the impulses transmitted after the reversed impulse, a selecting circuit, and means operated only in case said switches are operated to totalize the said predetermined number of impulses for completing said selecting circuit.

9. In a remote control system, a control station and a distant station, devices in the distant station, a trunk circuit comprising only two conductors extending between said stations, an operating circuit for operating said devices, a sender including means for transmitting a constant number of impulses over said trunk circuit, a first and a second switch responsive to said impulses for selecting one of said devices, a control circuit including said two conductors, means for reversing the polarity of one of said impulses, means responsive to the impulses transmitted before said reversal for operating said first switch to close a point in said operating circuit and a point in said control circuit, means responsive to said reversal for stopping said first switch and for starting said second switch, means for operating the said second switch responsive to the remaining impulses to complete said control circuit over said two conductors, and means included in said control circuit operated only in case said switches are operated to totalize the said constant number of impulses for completing said operating circuit.

10. In a control system, an impulsing circuit, a sender, means for operating the sender to transmit impulses over said circuit, a first switch and a second switch, devices, an operating circuit for operating any one of said devices, a pulsing relay included in said impulsing circuit operated responsive to the impulses transmitted by the sender, a stepping circuit for the first switch, means controlled by the pulsing relay over said stepping circuit for operating the first of said switches, means controlled by the sender for reversing the polarity of said impulsing circuit during a particular impulse, the particular impulse being reversed depending upon the particular device to be selected, a polarized relay also included in said impulsing circuit operated responsive to said reversed impulse, a stepping circuit for the second of said switches, means responsive to the operation of said polar relay for opening the stepping circuit of the first switch to stop the first switch in a position to close a point in said operating circuit, and for closing the stepping circuit of the second switch, a control circuit, means thereafter controlled by said pulsing relay over said second stepping circuit for operating said second switch to a complementary position to close said control circuit, and means operated over said control circuit only in case said switches have been operated to complementary positions by said sender and impulsing relay for completing said operating circuit to prepare the selected device for operation.

11. In a remote control system, a control office and a remote station, a trunk circuit connecting the office with said station, apparatus units at the remote station, an operating circuit for operating said units, a sender at the control office, a switch at the remote station having a normal position, means including said sender for transmitting a constant number of impulses over said trunk circuit, means in said switch responsive to the constant number of impulses for operating said switch in a complete cycle of operation back to its normal position, means for causing the character of one of said impulses to be changed, the particular impulse being changed depending upon the particular unit to be selected, selecting means at the remote station operated by the impulses transmitted before the changed impulse to select the particular unit corresponding to the particular changed impulse and to connect said selected unit to a portion of said operating circuit, a control circuit including said trunk circuit completed by said switch only in case said switch reaches its normal position in response to said constant number of impulses, means operated over the completed control circuit for closing a further point in said operating circuit, and means controlled at the will of the dispatcher at the control office for thereafter completing said operating circuit to operate the selected unit.

In witness whereof, I hereunto subscribe my name this 22nd day of December, A. D. 1925.

ALFRED ERNEST HUDD.